March 4, 1941.　　　K. J. W. FREITAG　　　2,233,697

TRAILER TRUCK

Filed April 10, 1939　　　2 Sheets-Sheet 1

INVENTOR.
KNUD J. W. FREITAG
BY
ATTORNEY.

March 4, 1941. K. J. W. FREITAG 2,233,697
TRAILER TRUCK
Filed April 10, 1939 2 Sheets-Sheet 2
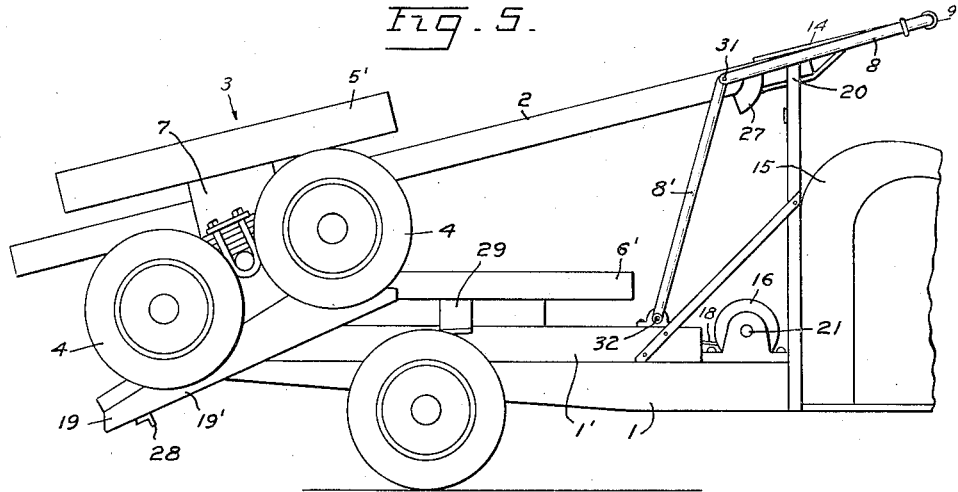
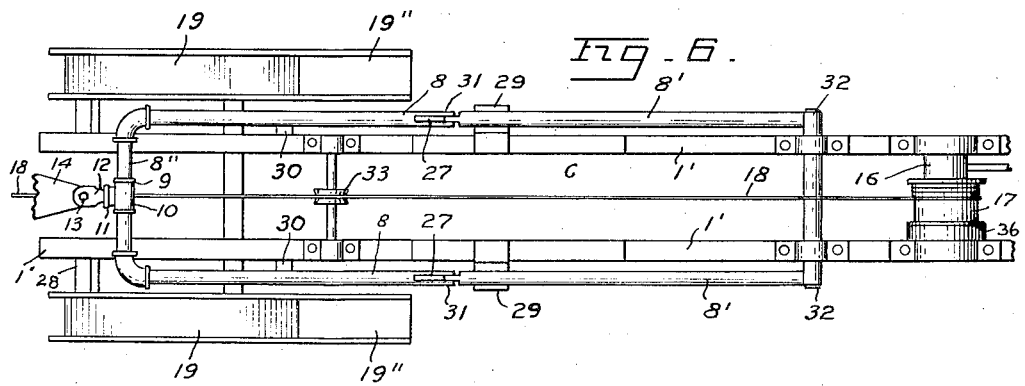
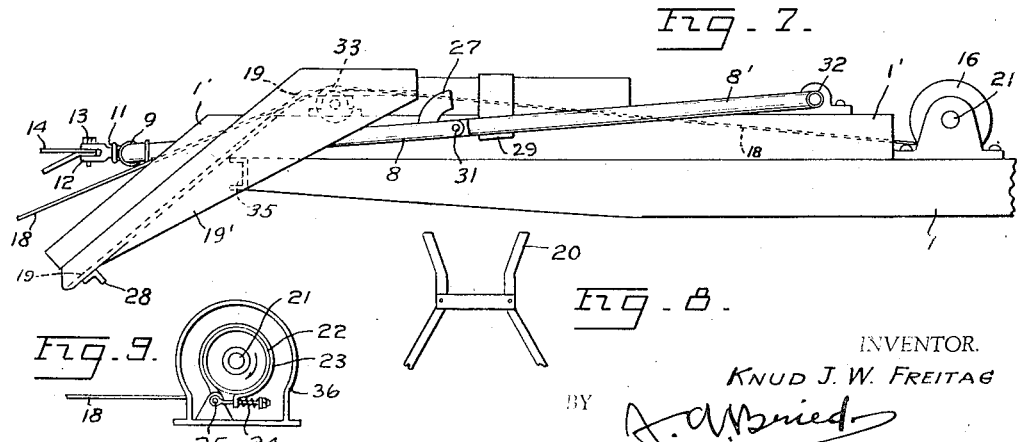
INVENTOR.
KNUD J. W. FREITAG
BY
ATTORNEY.

Patented Mar. 4, 1941

2,233,697

UNITED STATES PATENT OFFICE 2,233,697

TRAILER TRUCK

Knud J. W. Freitag, Oakland, Calif., assignor to F. A. B. Manufacturing Co., Oakland, Calif., a corporation of Nevada Application April 10, 1939, Serial No. 266,937

6 Claims. (Cl. 214—85)

This invention relates to trailer trucks in which a trailer is used at the rear end of a reach pole hitched to a motor truck, as used for hauling large long logs in the lumber countries and other similar long heavy objects, and the object of the invention is to provide improvements whereby after delivering the load, the trailer may be hauled onto the truck proper by engine power for carrying back on the return trip for the next load. A feature of the improvement is that no hinged or jointed reach pole is required. Other features and advantages of the invention will appear in the following description and accompanying drawings.

In the drawings:

Figure 5 is an enlarged side view showing in more detail the relation of the parts with the trailer loaded onto the truck.

Figure 6 is an enlarged plan view of the reach pole elevating frame and tracks showing their relation to the truck frame.

Figure 7 is a side view of Figure 6.

Figure 8 is a fragmentary front view of upper end of the pole cradle of Figure 5.

Figure 9 is a detached detail of the hoist automatic brake.

Figure 1:
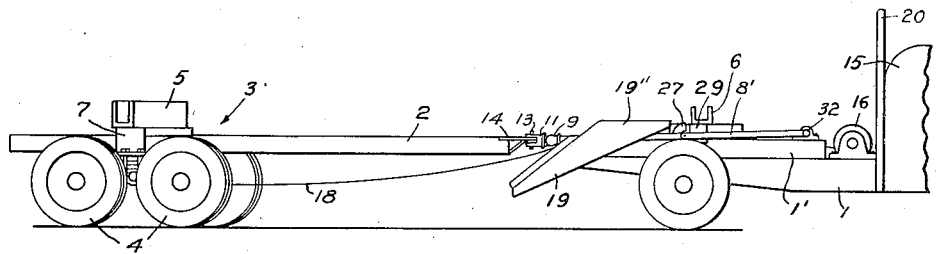
Figure 1 is a side elevation, somewhat in perspective showing my truck and trailer combination in extended position to receive a load—such as a large log to rest from the trailer bunk to the bunk on the truck.

Since the invention relates to the general coordination of operative parts rather than to the detail of such parts, the drawings and description are confined as much as possible to such coordination and no details of the well understood features of trucks and trailers is attempted.

In the drawings the frame of a conventional motor truck is shown at 1, and the truck is connected through a reach pole 2 to a dual axle truck trailer 3 having four or eight wheels 4— the latter being indicated in the present showing.

On the trailer and also on the truck is the usual transversely extending "bunk" or steel beam respectively designated 5, 6 across which the large log or other long load is extended and chained or otherwise secured in place, and which "bunks" are both turnable on vertical fixed pivots (not shown) in the common manner for turning from transverse to longitudinally extending position.

The reach pole 2 is slidably supported in a guide 7 in the frame of the trailer in the common manner, and the forward end of the pole is hitched to the rear section 8 of a special pivoted strut or "gallows" frame carried by the truck. This gallows frame is composed of two sections, 8 and 8' pivoted together at 31 on an axis extending transversely of the truck, and at the forward ends to horizontal pivots 32 secured to a sub-frame 1' secured to top of the truck frame 1. The use of the sub-frame 1' greatly facilitates mounting the new construction on a standard truck.

The gallows frame is preferably made of pipe, and rear section 8 is connected across the rear end by a member 8" on which are secured spaced collars 9 between which is a blank T 10 or other suitable connection revolvable on 8" and swivelly connected at 11 to a clevis 12 pivotally connected by a vertical pin 13 through the ends of a pair of strap irons 14 secured to the forward end of the reach pole 2.

Figure 2:
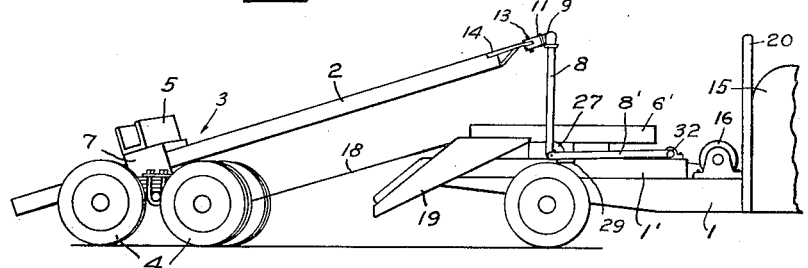
Figure 2 is a similar view to that of Figure 1 but showing power applied to the trailer axle rope, pulling the trailer toward the truck body.
Figure 3:
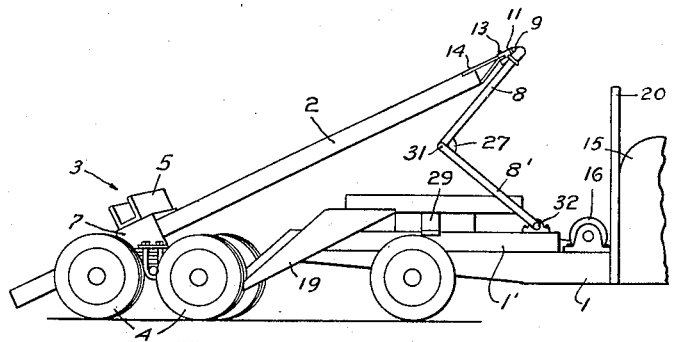
Figure 3 is a view showing a still further advanced position of the trailer toward the truck and with front wheels of trailer engaging the slanted tracks at rear end of the truck.
Figure 4:
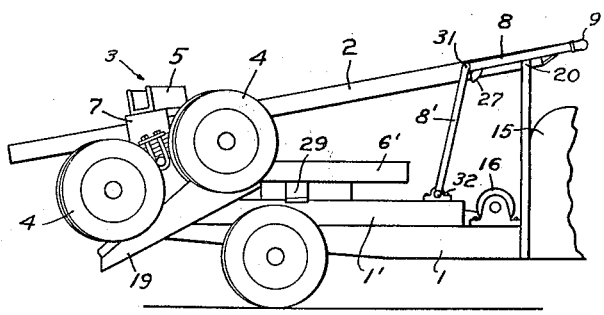
Figure 4 shows the trailer finally hauled up on the truck.

The joints 31 of the gallows frame are formed to permit upward swinging of rear section 8 to about a right angle only, with respect to forward section 8' (as by providing stops 27 on section 8), so that after it has been swung upwardly to that extent as shown in Figure 2 (by forward movement of the trailer relative to the truck), it will carry the forward section 8' up also, as indicated in Figure 3, and until the forward section 8' stands substantially vertical behind the back 15 of the cab as shown in Figure 4, where the trailer has been moved forward until it has mounted the truck.

In order to move the trailer forward and onto the truck in the progressive manner shown by Figures 1 to 4 a suitable power hoist 16 is mounted on the forward end of the truck body and from the underside of the drum 17 of which hoist a rope or ropes 18 extend rearwardly to the trailer, passing under its front axle and being suitably secured to its rear axle so that upon operating the hoist the trailer will be drawn toward the truck.

The rear end of the truck is provided with a pair of rigidly mounted downwardly slanted channel shaped tracks or guides 19, one in line with each inner wheel of the trailer, so that when the forward inner wheels of the trailer contact these slanted tracks in being drawn forward by the hoist, the wheels follow up the incline to the final position shown in Figures 4 and 5 and in which position the forward end of the reach pole 2 comes to rest into a cradle 20, shown best in Figure 8.

Before hauling the trailer up onto the truck body as described, the load supporting bunk 6 of the truck is turned on its vertical pivot mounting to extend longitudinally of the truck as indicated at 6' in Figure 5 to clear the trailer wheels and strut frame, and it is desirable that the load bunk 5 of the trailer be similarly turned for better road clearance, as indicated at 5' in Figure 5.

In Figure 5 but one of the slanted guides or tracks 19 is seen, but it is understood that there is another one at the opposite side of the truck for the opposite wheels of the trailer to roll up on. The tracks or guides are positioned to support the inner of the double wheels at the ends of the trailer axles, and also formed with stiffening side flanges 19'.

In Figures 6 and 7 the tracks and supporting frame structure are shown in enlarged scale and the load bunk of the truck has been omitted for clarity. The tracks are shown carried on and rigidly secured to a transversely extending beam or channel 35 secured to the rear end of the main truck frame 1, and are laterally braced by a transverse connecting member 28. These tracks are spaced outwardly from the sides of the frame 1' to permit the strut or gallows frame 8, 9, to come down between the tracks and the sub-frame and rest on supports 29, and the upper portion 19" of the tracks are bent substantially to horizontal position to receive the forward wheels of the trailer when the reach pole is in the cradle 20. Guiding blocks 30 on the outer sides of sub-frame 1' hold the strut frame against lateral movement.

In towing the trailer the pole hitch 10, 12 is below strut frame pivots 31 and 32 and hence does not tend to lift the frame in event of any forward lurching of the trailer relative to the truck, (though ordinarily the load on the bunks would prevent any such relative movement), but in order to lift the hitch joint relative to the pivot joints of the frame when the trailer is drawn forward by the hoist rope 18 this rope passes from the hoist under the truck bunk and over an elevating idler 33 and then downwardly under hitch member 10 and thence to the rear axle of the trailer and to which it is secured.

With the above arrangement of the rope 18, when the hoist is started the slack in the rope is first taken up and after which its increasing tension against the lower side of hitch member 10 lifts the hitch, together with the forward end of the reach pole and rear end 8" of frame section 8, and then the forward movement of the trailer due to the pull of the rope continues to force the pole and strut frame to swing upward as described.

The hoist is suitably operated forward or backward from the power take-off of the truck engine under control of the driver in the cab by suitable power transmission means not shown, and the hoist drum is provided with an automatic or spring loaded brake 36 to hold the trailer securely at any point while hauling it onto the truck, yet the force of which brake may be overcome by the engine power when reversing the hoist to pay out the line 18.

The arrangement of this brake is indicated in Figure 9 of the drawings and wherein the hoist shaft is designated 21, the brake drum 22, the brake strap 23, its spring 24, and its anchor 25. The arrow indicates the pulling movement of the rope.

While the brake may be relied upon to hold the trailer in place when loaded, any additional latch, or safety chain may be used if desired.

To unload the trailer, the hoist is reversed to slowly pay out the haulage line 18 and the trailer will roll off of the truck in reverse manner to that described in loading it, and the gallows frame 8, 8' will swing down to the substantially horizontal position shown in Figure 7, until it rests upon the supports 29.

From the above description it will be seen that no uncoupling of the trailer is ever required as the hitching connections are always maintained, and that no ratchet or pawls are required to check the hoist as its brake action is entirely automatic.

While I illustrate the invention as applied to a dual axle eight wheel trailer, it is manifest that it may be used with four wheel or two wheel trailers as well.

It is also manifest that while I show a pivoted strut or gallows frame of rectangular form, the shape and construction of this strut frame may be varied without departing from the spirit of the invention.

I am aware of prior truck-trailer combinations wherein the trailer could be hauled up upon the truck, but required that the reach pole be in sections pivoted or hinged together, and besides lacked the other features of advantage as hereinafter claimed.

I claim:

1. In the combination of a motor truck and trailer towed by the truck through a reach pole, having a power winch on the truck with a rope extending from the winch to the trailer for hauling it toward the truck, and downwardly slanted track means at the rear of the truck to receive and guide the trailer wheels upwardly onto the truck as the winch is operated, the improvement which comprises a strut frame normally lying substantially horizontal upon the truck pivoted at its forward end to the truck and pivotally connected at its rearward end to the forward end of the reach pole in a manner to carry said end of the reach pole upward and forwardly over the truck as said trailer is hauled up onto the truck, said strut frame formed with legs positioned to lie adjacent the outer sides of the truck frame when the trailer is in position for towing.

2. In the combination of a motor truck and trailer towed by the truck through a reach pole, having a power winch on the truck with a rope extending from the winch to the trailer for hauling it toward the truck, and downwardly slanted track means at the rear of the truck to receive and guide the trailer wheels upwardly onto the truck as the winch is operated, the improvement which comprises a strut frame normally lying substantially horizontal upon the truck pivoted at its forward end to the truck and pivotally connected at its rearward end to the forward end of the reach pole in a manner to carry said end of the reach pole upward and forwardly over the truck as said trailer is hauled up onto the truck, said strut frame provided with a pivotal joint intermediate its length adapting the normally rearmost portion to swing upwardly with respect to the forward portion, and further toward elevated horizontal position and bringing the forward section to upright position on its pivotal connection to the truck.

3. In the combination of a motor truck and trailer towed by the truck through a reach pole, having a power winch on the truck with a rope extending from the winch to the trailer for hauling it toward the truck, and downwardly slanted track means at the rear of the truck to receive and guide the trailer wheels upwardly onto the truck as the winch is operated, the improvement which comprises a strut frame normally lying substantially horizontal upon the truck pivoted at its forward end to the truck and pivotally connected at its rearward end to the forward end of the reach pole in a manner to carry said end of the reach pole upward and forwardly over the truck as said trailer is hauled up onto the truck, said strut frame provided with a pivotal joint intermediate its length adapting the normally rearmost portion to swing upwardly with respect to the forward portion, and means to limit such relative movement of the two frame portions whereby after the rearward portion has been swung upwardly for a distance it will engage the forward section and raise the latter on its pivotatl connection while projecting forwardly of said forward section.

4. In the combination of a motor truck and trailer towed by the truck through a reach pole having a power winch on the truck with a rope extending from the winch to the trailer for hauling it toward the truck, and downwardly slanted track means at the rear of the truck to receive and guide the trailer wheels upwardly onto the truck as the winch is operated, the improvement which comprises a strut frame normally lying substantially horizontal upon the truck pivoted at its forward end to the truck and pivotally connected at its rearward end to the forward end of the reach pole in a manner to carry said end of the reach pole upward and forwardly over the truck as said trailer is hauled up onto the truck, said reach pole being of continuous rigid construction and a fixed cradle on the forward portion of the truck body straddled on opposite sides by said strut frame in swinging, and into which cradle the upper end of said reach pole rests when the trailer is on the truck.

5. In the combination of a motor truck and trailer towed by the truck through a reach pole having a power winch on the truck with a rope extending from the winch to the trailer for hauling it toward the truck, and downwardly slanted track means at the rear of the truck to receive and guide the trailer wheels upwardly onto the truck as the winch is operated, the improvement which comprises a strut frame normally lying substantially horizontal upon the truck pivoted at its forward end to the truck and pivotally connected at its rearward end to the forward end of the reach pole in a manner to carry said end of the reach pole upward and forwardly over the truck as said trailer is hauled up onto the truck, said reach pole being of continuous rigid construction and said truck provided with a driver's cab forward of the truck body, and said strut frame being jointed to swing toward horizontal position over the top of said cab and carry the extreme forward end of said reach pole with it.

6. In the construction as set out in claim 1, means to hold the rearward free end of said frame rigid against lateral movement when in substantitally horizontal position.

KNUD J. W. FREITAG.